F. C. Treadwell,
Cracker Machine,
Nº 14,889.    Patented May 13, 1856.
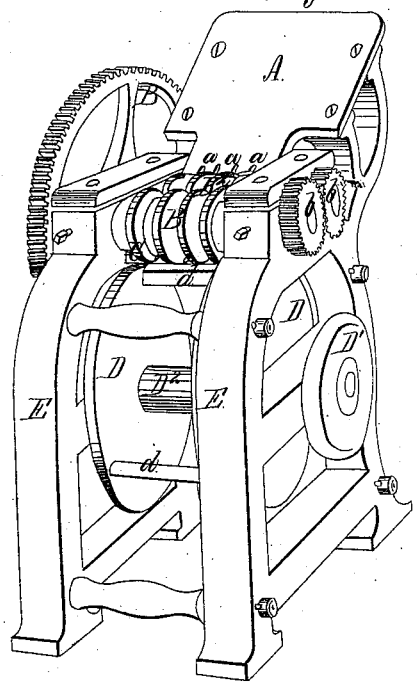
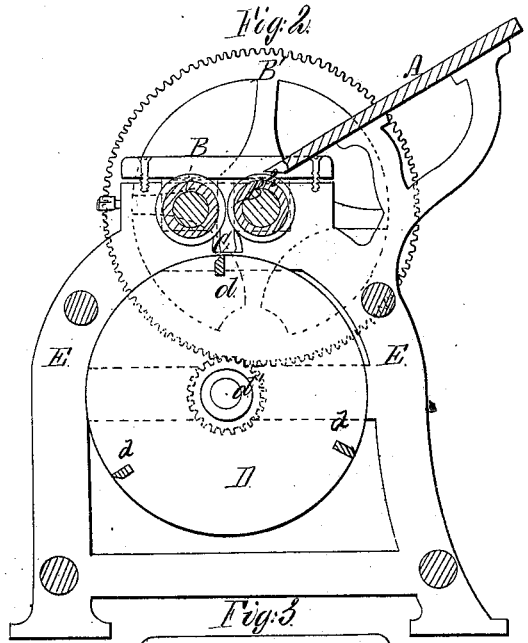
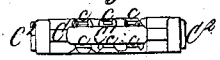
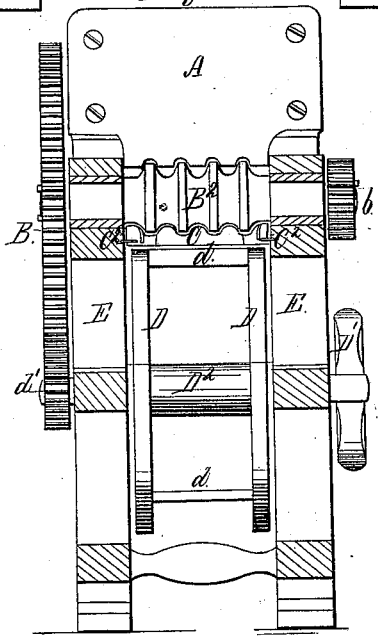

UNITED STATES PATENT OFFICE.

F. C. TREADWELL, JR., OF NEW YORK, N. Y.

MACHINE FOR PREPARING DOUGH FOR MOLDING CRACKERS.

Specification of Letters Patent No. 14,889, dated May 13, 1856.

*To all whom it may concern:*

Be it known that I, FRANCIS C. TREADWELL, Jr., of the city, county, and State of New York, have invented a certain new and useful Machine for Preparing the Dough for Molded Crackers, and do hereby declare the following to be a full description of the same.

The nature of my invention consists—

First, in forming a sheet of dough into continuous cylindrical strips by means of a pair of concave grooved rollers which have a continuous motion the grooves being semicircular and cut in the rollers parallel to each other around the circumference of the same, the opposite edges of the grooves in each roller to match or meet the other so that a sheet of dough being fed between them is cut or pressed into continuous cylindrical strips. This is an old device.

Second, in combining with the aforesaid grooved rollers a guide or throat piece which is fastened to the frame on each side firmly so that it shall not spring or move. This throat piece is parallel to the rollers and fits up to and between them closely into the grooves sufficiently below the point of contact of the rolls with each other to permit the opening or passage way (which is of rectangular form extending the whole length of the rollers), to be a little wider than the diameter of the grooves, so that the strips of dough shall be guided and pass freely down through the opening. The lower edges of the throat piece are square or may be slightly curved to correspond with the sweep of a rotating cutter which passes as near as possible without touching so as to form a shears to cut off the strips of dough of equal length as they are fed down from the grooved rollers through the throat piece.

Third, in combining with the aforesaid throat piece and grooved rollers one or more rotating blades which are fastened firmly to a horizontal shaft on one end of which is a pinion cog wheel which drives a spur wheel attached to one of the grooved rolls. The length of the piece of dough to be cut depends on the relative size or diameters of the pinions and spur wheels. This shaft is in line with the rolls and directly under the middle of the throat piece and to this shaft the driving power should be applied. The blades are as long as the space occupied by grooves and are secured to the shaft at each end by heads keyed on to the shaft. They should be thick enough to prevent springing and as wide or wider than the length of the piece of dough to be cut. The outer eye of the blades is parallel to the throat piece and sweeps as close to it as possible without striking.

The circle which the blades describe should be so large relatively to the width of the aperture in the throat piece as practically to make almost a straight shear in passing said throat piece. But to describe more particularly my invention I will refer to the accompanying drawings forming a part of this schedule the same letters of reference wherever they occur referring to the same parts.

Figure No. 1 is a perspective view showing front and side elevation of this machine. Figs. No. 2 and No. 3 are opposite cut sections. Fig. No. 4 views of throat piece.

Letter E is the frame of the machine having attached to it the feed board A on which the sheet of dough is placed to be fed into and between the grooved rollers B, B², which have equal surface motion and are geared together by coupling cog wheels $b$, $b$, and driven by a cog wheel B' on the outer end of the shaft of the grooved roller B² gearing into cog wheel $d$ on the end of the rotary cutter shaft D² to which the power is applied.

Letter C is the throat or guide piece let into the frame at C² and fitting closely the grooved rollers B B² on each side of the rectangular opening or passage way C'.

D D are circular heads or disks attached to shaft D² and attached to the heads at each end are the blades $d\ d\ d$ which as they rotate pass closely the lower edges of the throat piece C so as to shear off the strips of dough into pieces of uniform size which may fall into a box placed under the machine to catch them.

The operation of the several parts are that the dough which is fed into the grooved rollers passes from them in cylindrical strips down through the throat piece and is sheared off by the rotating blades into pieces of the proper size for molding by hand.

Having now described my invention I will state what I desire to claim and secure by Letters Patent of the United States.

I claim the use of the cutters in combination with the throat for the purpose of making a shear cut when used in combination with the grooved rollers substantially as herein before described.

F. C. TREADWELL, Jr.

Witnesses:
JOHN M. McCOLLUN,
LUCIUS A. ROCKWELL.